(No Model.)
H. D. COWLES.
DIE FOR CUTTING NAILS.
No. 288,165. Patented Nov. 6, 1883.
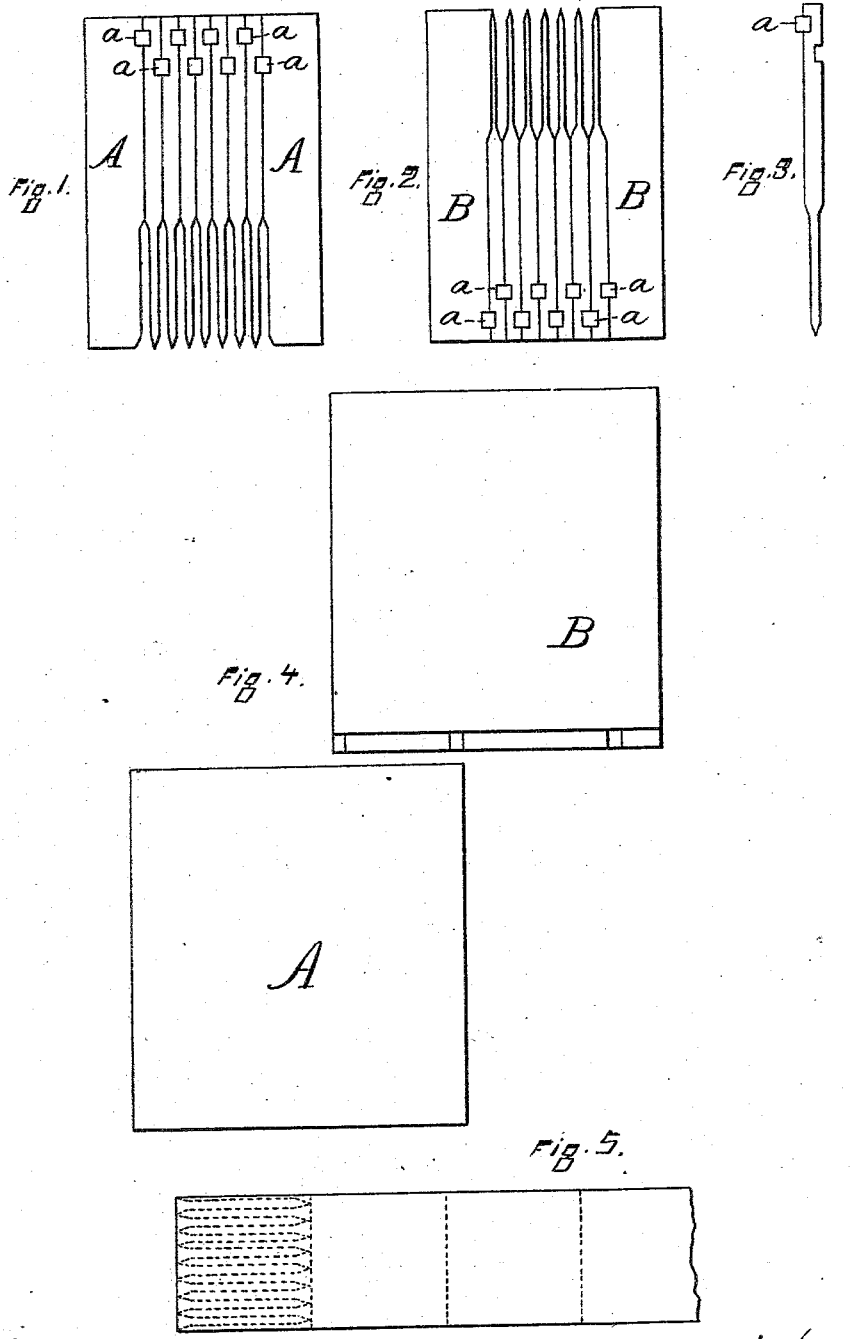
Witnesses.
John Edwards Jr.
Martin A. Pond
Inventor.
Harley D. Cowles
By James Shepard
Atty.

UNITED STATES PATENT OFFICE.

HARLEY D. COWLES, OF BRIGHTON PARK, ILLINOIS, ASSIGNOR TO F. W. BEALE, OF LYNN, MASSACHUSETTS.

DIE FOR CUTTING NAILS.

SPECIFICATION forming part of Letters Patent No. 288,165, dated November 6, 1883.

Application filed August 14, 1883. (No model.)

*To all whom it may concern:*

Be it known that I, HARLEY D. COWLES, a citizen of the United States, residing at Brighton Park, in the county of Cook and State of Illinois, have invented certain new and useful Improvements in the Manufacture of Nails, of which the following is a specification.

My invention relates to improvements in the manufacture of cut nails, spikes, &c., and in the dies for cutting the same; and the objects of my improvements are to more conveniently construct the dies, and to cut the nails more expeditiously, and in such manner that the grain of the iron will run lengthwise with the nail.

In the accompanying drawings, Figure 1 is a plan view of the face or cutting end of one gang of my dies. Fig. 2 is a plan view of the non-cutting end of the companion gang of dies. Fig. 3 is an end view of a single piece or plate, a series of which form a gang of my dies. Fig. 4 is a side elevation of the two gangs of dies in proper position relatively to each other for cutting, and Fig. 5 is a diagram representing the manner of cutting the stock.

I form my dies from steel plates by slabbing off the sides near one edge, so as to leave a narrow middle portion which in edge view is substantially of the form of the nail to be cut, as shown by the lower end of the plate of steel represented in Fig. 3. A gang of these plates of any desired number are placed side by side, as represented in Figs. 1 and 2. In order to hold the plates in unison, I have grooved the sides of the plates and inserted splines *a*, as clearly shown in Figs. 1, 2, and 3. If desired, instead of these grooves and splines, the plates, after being properly set together, may be drilled through transversely and held in proper relative position by a rod or rods. Upon the sides of one gang I place thicker plates A, which are slabbed off, the same as the other plates, but upon one side only, which thick pieces perfect and complete the gang of dies, said thicker plates A being of the same length as the narrower plates, and also forming a part of the cutting-edge of the die. By the side of the companion gang of dies I also place thicker plates B, which plates, instead of being slabbed off in the same manner as the plates between them, are slabbed off so as to fit closely to the outside plates of the gang, as shown in said Fig. 2, and thereby prevent the reduced portions of the narrow die-plates from spreading sidewise. These pieces B B are made shorter than the plates between them, as shown in Fig. 4, so that this gang of dies may enter the spaces between the plates in the companion gang and act as a punch. Each reduced portion of the die-plates acts as a punch, while the space between each two adjoining die-plates acts as a die. Any suitable arrangement may be provided for clamping or holding these gangs of dies in a press or other suitable machine, and they may be placed with one gang directly over the other, so as to cut vertically, as shown in Fig. 4; or, if desired, they may be set face to face, with their faces in a vertical position, so as to cut horizontally.

In forming the die-plates their reduced parts will be made thinner at the non-cutting end than at their faces or cutting end, so that the spaces between them will free the nails and prevent them from clogging within the die. These dies may be used for cutting nails from a long strip of metal whose width is equal to the length of the nail to be cut, and for this purpose gages may be provided substantially the same as shown in my Patent No. 145,336, dated December 9, 1873. After the cutting has commenced, the strip may be placed with its end projecting over the last die a sufficient distance to form the piece cut off from the end of the strip into a nail, substantially as shown and described in said patent. It is well known that in plate or sheet metal the grain of the iron runs lengthwise with the bars or plates. If the nails are cut from a strip of rolled metal crosswise to this grain, their strength is greatly impaired, and it is necessary to use a superior quality of iron. If the nails are so cut as to have the grain of the iron run lengthwise of the nail, a much cheaper grade of iron may be used and produce equally as good or better nails. With the dies arranged in gangs, as hereinbefore described, I can easily cut the nails so as to have the grain of the iron run lengthwise, by first cutting a strip whose width is about equal to the width of the gang of dies into short pieces of the length of one nail, as indicated by the transverse broken lines on the metal strip, Fig. 5. These strips are then stacked one above the other in a suitable hopper, and one by one placed between the dies and up against the gages, after which the dies are brought together and cut the whole piece into nails at a single blow, as indicated by the broken lines at the left-hand end of Fig. 5. In thus cutting the nails with this gang of dies part of the nails pass through the spaces between one gang of dies, and part of them pass in the opposite direction through the spaces between the companion gang of dies.

I intend to provide a simple arrangement upon the press or machine which will automatically push one plate over the gang of dies for every motion of the press or machine; but the plates may be pushed over the dies and up against the gage by hand.

I claim as my invention—

1. The gang of dies for cutting nails, consisting of a series of plates having a reduced portion whose contour in end view is substantially the same as the nail to be cut, said plates being suitably fastened together, substantially as described, and for the purpose specified.

2. The herein-described dies, consisting of two gangs of plates having a reduced portion whose contour in end view is substantially the same as the nail to be cut, and the thicker side plates, A A and B B, respectively formed with relation to the plates between them, substantially as described, and for the purpose specified.

HARLEY D. COWLES.

Witnesses:
 HARRY A. WILLS,
 MATTHEW LARNEY.